(12) United States Patent
Primos et al.

(10) Patent No.: US 7,918,709 B1
(45) Date of Patent: Apr. 5, 2011

(54) COMBINED GAME CALL APPARATUS

(75) Inventors: Wilbur R. Primos, Madison, MS (US); David R. Weldon, Hot Springs, AR (US)

(73) Assignee: Primos, Inc., Flora, MS (US)

( * ) Notice: Subject to any disclaimer, the term of this patent is extended or adjusted under 35 U.S.C. 154(b) by 1129 days.

(21) Appl. No.: 11/619,063

(22) Filed: Jan. 2, 2007

(51) Int. Cl.
*A63H 33/40* (2006.01)
*A63H 5/00* (2006.01)

(52) U.S. Cl. ......... 446/202; 446/204; 446/207; 446/397

(58) Field of Classification Search .......... 446/202–209, 446/216, 397, 416
See application file for complete search history.

(56) References Cited

U.S. PATENT DOCUMENTS

| | | | | |
|---|---|---|---|---|
| 632,184 | A * | 8/1899 | Johnson | 446/206 |
| 742,680 | A | 10/1903 | Kuhlemeier | |
| 2,056,623 | A * | 10/1936 | Scott | 446/206 |
| 2,229,322 | A * | 1/1941 | Berlin | 446/206 |
| 3,054,216 | A * | 9/1962 | Testo | 446/208 |
| 3,466,794 | A * | 9/1969 | McBroom et al. | 446/206 |
| 3,928,935 | A * | 12/1975 | Beadles, Jr. | 446/208 |
| 3,955,313 | A | 5/1976 | Faulk | |
| 4,211,031 | A | 7/1980 | Gambino | |
| 4,612,001 | A | 9/1986 | Burnham | |
| 5,910,039 | A * | 6/1999 | Primos et al. | 446/207 |
| 6,109,202 | A * | 8/2000 | Topman et al. | 116/137 R |
| 6,149,492 | A | 11/2000 | Davis, Jr. | |
| 6,413,139 | B1 * | 7/2002 | Douglas | 446/204 |
| D486,413 | S | 2/2004 | Primos | |
| 6,926,578 | B1 * | 8/2005 | Casias et al. | 446/202 |
| 7,037,167 | B2 | 5/2006 | Primos et al. | |
| 7,145,067 | B2 * | 12/2006 | Pfortmiller et al. | 84/380 R |
| 7,465,213 | B1 * | 12/2008 | Pribbanow | 446/202 |
| 7,553,210 | B1 * | 6/2009 | Keller et al. | 446/202 |

OTHER PUBLICATIONS

Advertisement for Combo-Call, Combination Duck and Goose Call by Superior Tool & Die Co., Inc., 1959.
Photograph of combination duck and goose call by Faulk, date unknown.
Article, Mascot Duck Calls by Multi-Novelty Co., date unknown.

* cited by examiner

*Primary Examiner* — Gene Kim
*Assistant Examiner* — Alyssa M Hylinski
(74) *Attorney, Agent, or Firm* — Holland & Hart

(57) ABSTRACT

A combined game call apparatus includes a unitary game call body in which a first game call and a second game call are formed in an over-and-under manner relative to each other. The first game call has a first inlet and a first air passageway associated with the first inlet. The second game call having a second inlet and a second air passageway associated with the second air inlet. The first game call may comprise a whistle-type game call the second air passageway may be generally cylindrical in cross section and may have a truncating, planar side wall proximate the first air passageway such that the truncating, planar side wall allows the first and second game calls to be closely positioned relative to each other and reduces the overall top-to-bottom profile of the unitary call.

19 Claims, 7 Drawing Sheets

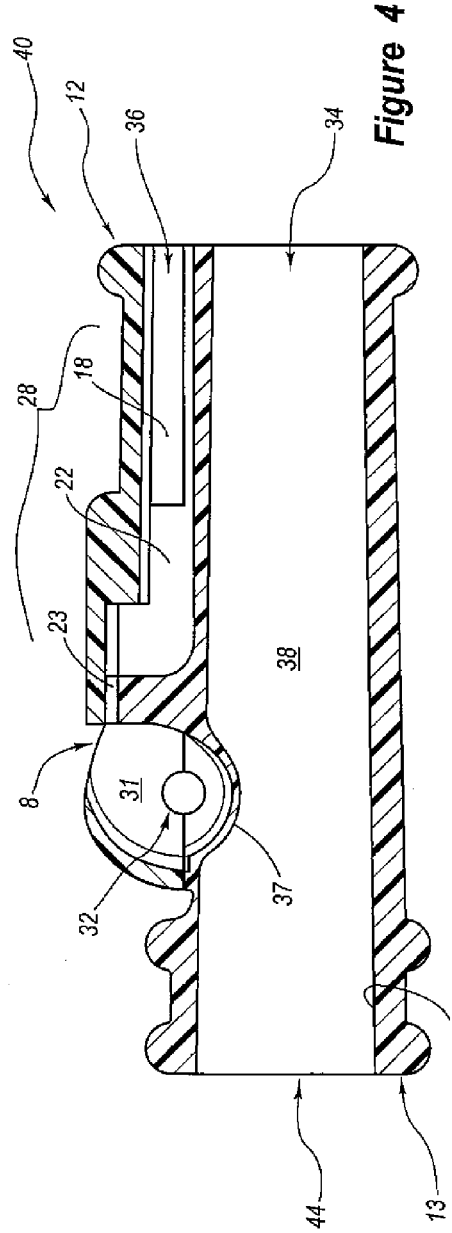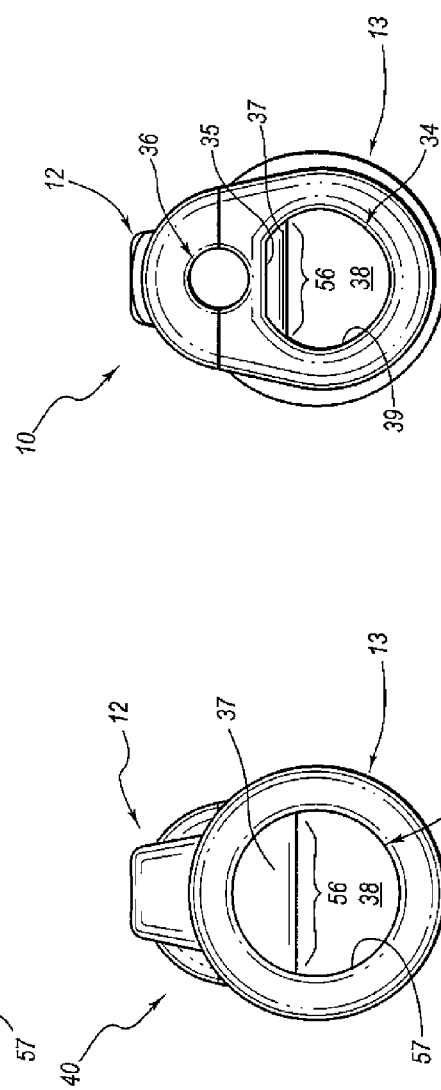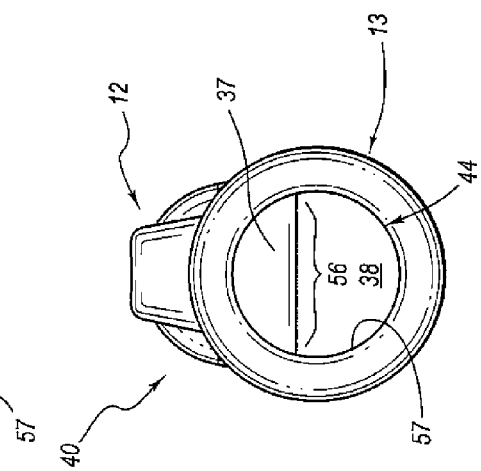

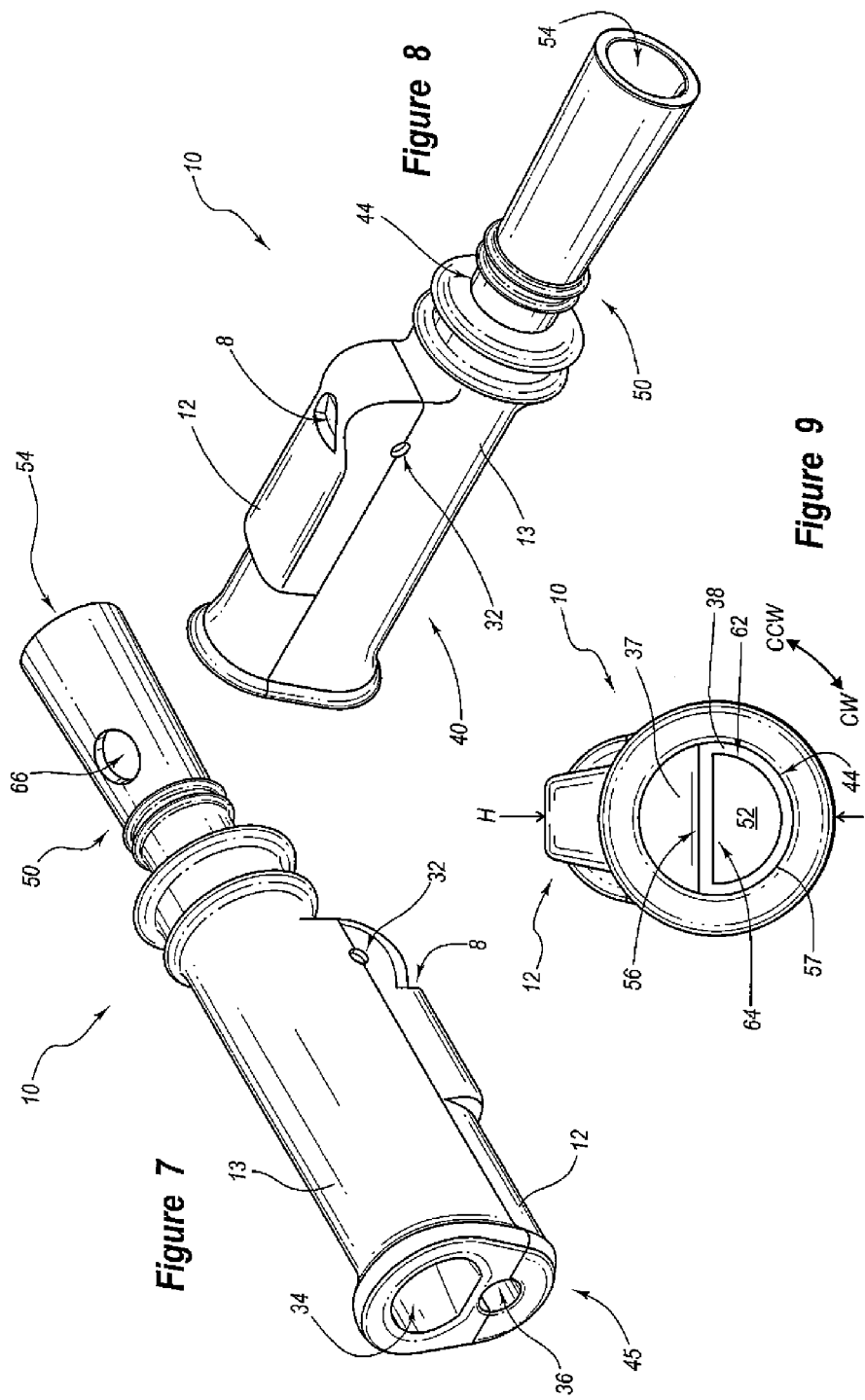

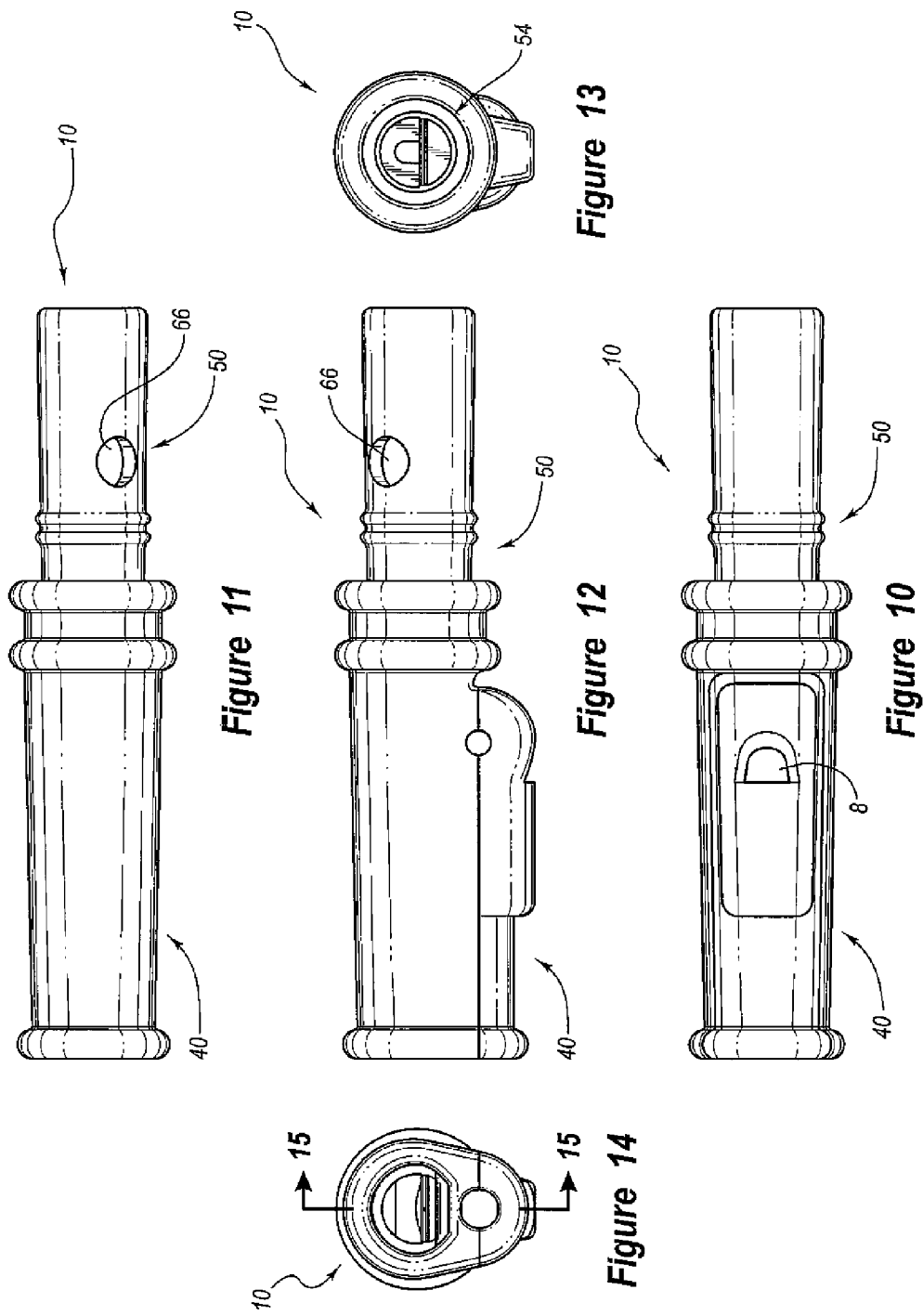

COMBINED GAME CALL APPARATUS

TECHNICAL FIELD OF THE INVENTION

This invention relates to game calls for simulating sounds of animals.

BACKGROUND

Over the years, game calls have been developed for the purpose of simulating vocalizations made by animals. More particularly, a game call may be employed for attracting a selected animal or bird toward a location from which the call is produced. Accordingly, game calls are used by hunters, photographers, wildlife watchers, and other outdoor and wildlife enthusiasts. Generally, continual efforts are being made to improve game calls to more closely replicate the actual sounds of particular animals or birds of interest.

Hunters and other outdoor and wildlife enthusiasts often desire to access and utilize multiple types of game calls when trying to attract game. Waterfowl hunters, for example, commonly carry a number of different waterfowl calls around their neck, so that the various calls can alternately be used. These different types of calls can create unnecessary noises (e.g., noises caused by the multiple calls clanking together). Also, there can be delays and logistics problems when switching from one call to another. For example, it is common for a person to carry multiple game calls and/or sound-producing devices at a common location (e.g., around the person's neck using one or more lanyards or in the person's pocket). A game call for making standard duck calls of a mallard, for example, is much different that a game call used to make the whistling sounds of widgeon, teal, or pintail and the grunting sounds of the mallard drake.

When a person desires to use multiple game calls, it may be difficult to locate and utilize the desired game call quickly and efficiently. Multiple game calls can also become separated from each other, and may become lost more readily. Use of multiple and separate game calls can also create problems in terms of call orientation and function. In using multiple game calls, it can be difficult to grasp, orient, and use each of the game calls in an efficient and effective manner.

Prior game calls have been developed where more than one call has been incorporated into a single game device. Nevertheless, several problems and design needs have remained.

A need exists, therefore, to develop a combined game call apparatus that effectively and efficiently incorporates two or more game calls into a single game call device. An additional need exists to develop a combined game call that will assist the user in to locate and use multiple game calls. There is also a need for a combined game call that may provide inlet apertures immediately adjacent one another, with one over the other, so that all the person using the call needs to do is move his or her lips to the other call. There is a further need for a combined game call that may provide each call in a ready-to-use, pre-oriented configuration relative to one another. There is yet another need for a combined game call that may further comprise a relatively low vertical profile to make the call easier to carry and use. There is still a further need for a combined game call apparatus that may combine at least two game calls, one of which is a whistle-type game call.

SUMMARY

According to some embodiments of the present disclosure, a combined game call apparatus comprises a unitary game call body in which a first game call and a second game call are formed in an over-and-under configuration relative to each other. The first game call has a first inlet and a first air passageway associated with the first inlet. The second game call has a second inlet and a second air passageway associated with the second air inlet. In some embodiments, the first game call comprises a whistle-type game call.

In certain embodiments, a chamber is formed in the first air passageway. A free-floating structure is further disposed inside the chamber to create a trill when air passes through the first air passageway. The free floating structure may be selected from the group consisting of a generally cylindrical tube, a solid generally cylindrical element, and a generally spherical element.

In some embodiments, the unitary game call body has a vertical profile that is smaller than a combined profile of two independent and separate game calls of similar types. More specifically in certain embodiments, the cross-sectional shape of the first air passageway is substantially circular and the cross-sectional shape of the second air passageway is generally circular with a truncating wall proximate the first air passageway. In other embodiments, the whistle-type game call comprises a chamber and a vent exiting the game call laterally of the first air passageway.

In still other embodiments of the instant disclosure, a combined game call apparatus comprises a unitary game call body. A first game call and a second game call are formed in the unitary body in an over-and-under configuration. The first game call has a first inlet and a first air passageway associated with the first inlet, wherein the cross-sectional shape of the first air passageway is substantially cylindrical. The second game call has a second inlet and a second air passageway associated with the second air inlet, wherein the cross-sectional shape of the second air passageway is generally cylindrical and includes a truncating, planar side wall proximate the first air passageway. The truncating, planar side wall allows the first and second game calls to be more closely positioned relative to each other and reduces the overall top-to-bottom profile of the unitary game call.

In further embodiments of the present disclosure, the first game call comprises a whistle-type game call, which may include a chamber formed in the first air passageway. A tubular structure may be disposed inside the chamber to create a trill when air passes through the first air passageway. In some embodiments, the unitary game call body may have a vertical profile smaller than a combined profile of two separate and independent game calls of similar types. In various embodiments, the free floating structure is selected from the group consisting of a generally tubular cylinder, a solid generally cylindrical element, and a generally spherical element.

In other embodiments, the whistle-type game call may comprise a chamber formed in the first air passageway and a generally tubular cylinder which moves about the chamber when air passes through the first air passageway to create a trill sound. The whistle-type game call may further comprise a chamber and an outlet to allow air to exit the game call laterally of the first air passageway.

In some embodiments, the first game call may comprise a whistle-type game call, which may create a fluttering whistle of a pintail duck. In other embodiments, the whistle-type game call may create grunting sounds of a duck.

In yet another embodiment, a combined game call apparatus may comprise a unitary game call body, wherein a first game call and a second game call are formed in the unitary body in an over-and-under configuration. The first game call may have a first inlet and a first air passageway associated with the first inlet, wherein the cross section of the first air passageway is substantially cylindrical in cross section. The second game call may have a second inlet and a second air passageway associated with the second air inlet, wherein the second air passageway is generally cylindrical in cross section and has a truncating, planar side wall proximate the first air passageway. The truncating, planar side wall may allow the first and second game calls to be closely positioned relative to each other and may reduce the overall top-to-bottom profile of the unitary call. The first game call may also comprises a chamber and a free-floating structure disposed inside the chamber to create a trill when air passes through the first air passageway.

Features from any of the above-mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE DRAWINGS

Further features of the subject matter of the present invention, its nature, and various advantages will be more apparent from the following detailed description and the accompanying drawings, which illustrate various exemplary embodiments, are representations, and are not necessarily drawn to scale, wherein:

FIG. 4 shows a schematic, side cross-sectional view of the barrel assembly shown in FIGS. 2 and 3;

FIGS. 5 and 6 show respective end views of the barrel assembly shown in FIGS. 2-4;

FIGS. 7 and 8 show respective perspective views of a game call apparatus including a barrel assembly and a stopper assembly according to the present invention;

FIG. 9 shows a schematic end view of the game call apparatus shown in FIGS. 7 and 8;

FIG. 10 shows a top elevation view of the game call apparatus shown in FIGS. 7 and 8;

FIG. 11 shows a bottom elevation view of the game call apparatus shown in FIGS. 7 and 8;

FIG. 12 shows a side view of the game call apparatus shown in FIGS. 7 and 8;

FIGS. 13 and 14 show respective end views of the game call apparatus shown in FIGS. 7 and 8;

DETAILED DESCRIPTION OF THE INVENTION

Generally, the present invention relates to a combined game call apparatus including a first game call having a first air passageway configured to produce at least a first sound in response to air passing through the first air passageway (i.e., by a user forcing air through the first passageway) and a second game call having a second air passageway configured to produce at least a second sound in response to air passing through the second air passageway. In one embodiment, the first game call and the second game call are oriented one on top of another to form a so-called over-and-under game call, although a side-by-side configuration may also be used.

The first game call may comprise a whistle-type game call, and may be configured to produce a particular game call sound (e.g., a trill or other whistle-type sound, which may be associated with the whistling sounds of widgeon, teal, or pintail, and the grunts of a mallard drake) in response to air passing through the first air passageway (i.e., by a user forcing air through the first air passageway). The second game call may comprise a duck call, including a barrel assembly and a stopper assembly coupled to the barrel assembly. The second game call may be configured to produce a particular game call sound (e.g., typical sounds of waterfowl, including ducks and geese, or sounds of another game birds or animals) in response to air passing through the second air passageway (i.e., by a user forcing air through the second air passageway). Generally, any game call elements or components discussed below may be formed by plastic injection molding or as otherwise known in the art, without limitation. Accordingly, barrel assembly components, stopper assembly components, or any other elements or components may comprise a thermoplastic, such as, for example, polyethylene, polypropylene, polyvinylchloride, or any other material as known in the art, without limitation. In addition, metals or other suitable materials may comprise selected game call elements or components, without limitation.

Figure 1:
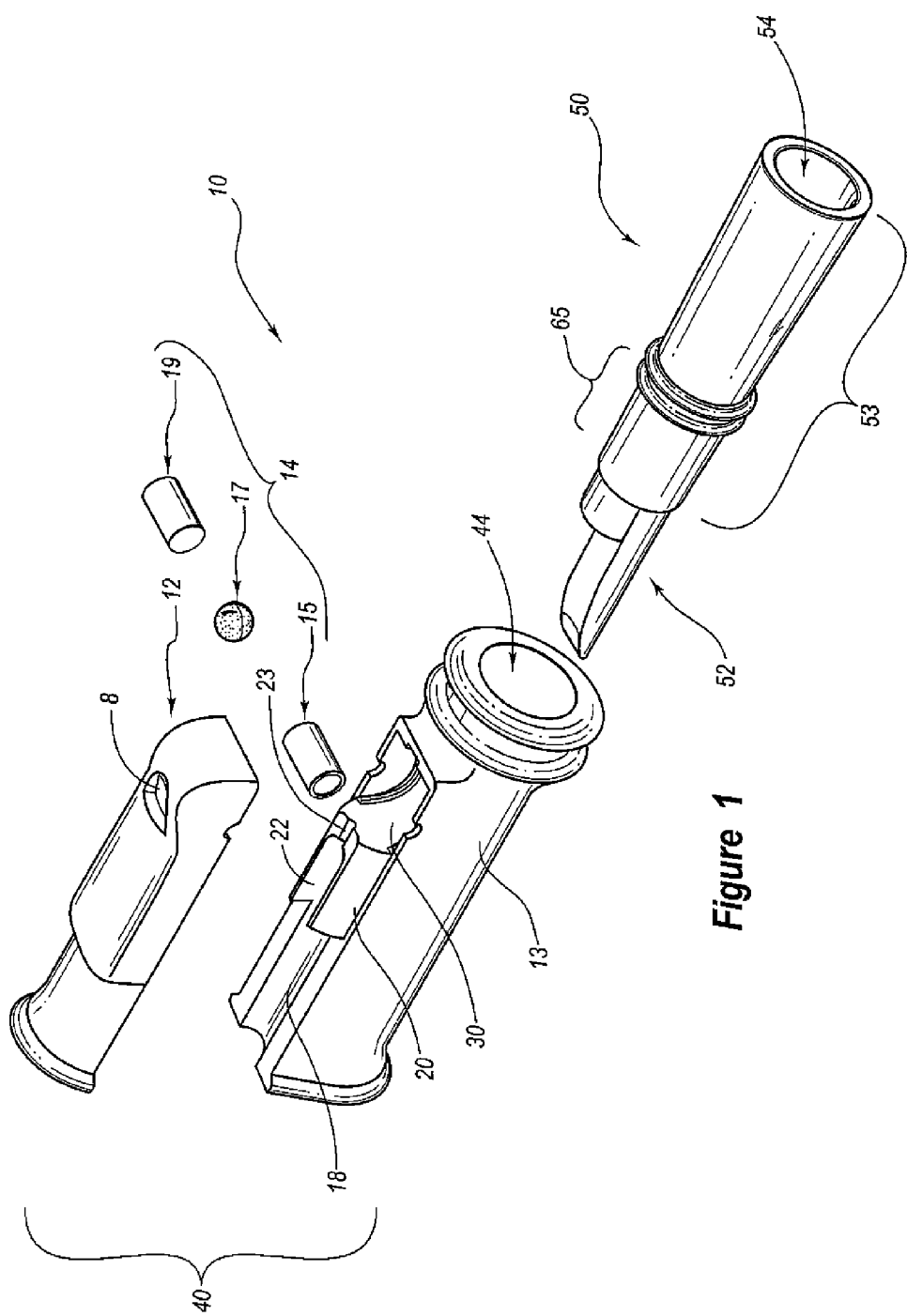
FIG. 1 shows an exploded perspective view of a game call apparatus including a barrel assembly and a stopper assembly according to the present invention.

For example, FIG. 1 shows an exploded assembly view of one embodiment of a game call apparatus 10. More specifically, as shown in FIG. 1, game call apparatus 10 generally includes a barrel body 13, a upper housing 12, and a stopper assembly 50. Barrel body 13 may define a bore or passageway through which air may interact with stopper assembly 50 to create desired game animal or bird sounds. In addition, an exterior topography of barrel body 13 in combination with upper housing 12 may form an additional air-conducting passageway and structure for creating sounds. More particularly, as shown in FIG. 1, barrel body 13 includes lower recess 18, raised wall region 20, upper recess 22, restricted recess 23, and chamber recess 30. As will be understood by one of ordinary skill in the art, upper housing 12, when properly positioned adjacent to barrel body 13, may form a passageway through which air may be forced to produce a sound. In at least one embodiment, upper housing 12 in combination with barrel body 13 defines a first game call having a first air passageway, which allows air to be introduced at inlet 36 (FIG. 3) and to exit the game call laterally of the first air passageway at outlet 8. Optionally, at least one movable element in the form of a free-floating structure 14 (e.g., one or more of: a generally tubular cylinder tube 15, a generally spherical element 17, or a solid, generally cylindrical element 19) may be positioned generally within a chamber formed by chamber recess 30 and a portion of upper housing 12. Such a configuration may produce a varying sound (e.g., a trill sound, a staccato sound, a fluttering sound, an undulating sound, or another type of sound that varies) when air passes through the first air passageway defined by upper housing 12 in combination with barrel body 13.

Figure 3:
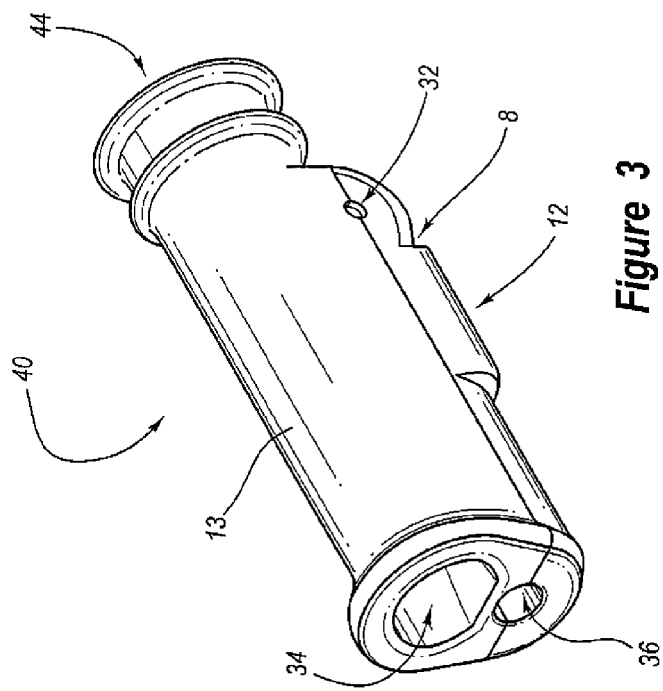
FIGS. 2 and 3 show respective perspective views of the barrel assembly shown in FIG. 1.
Figure 2:
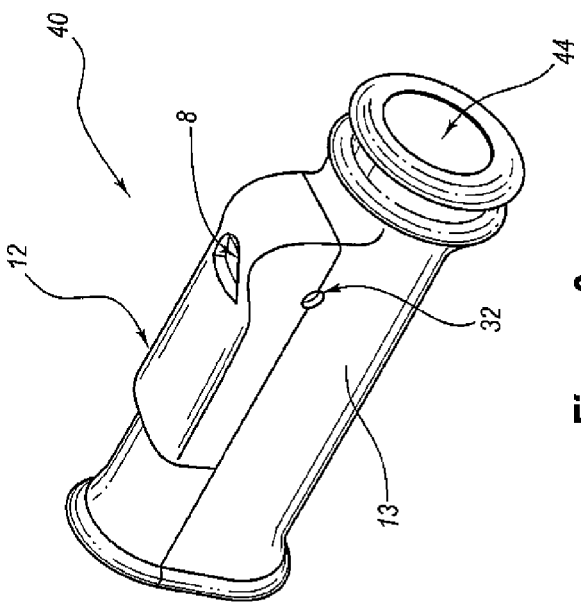

In further detail, FIGS. 2 and 3 show different perspective views of barrel assembly 40, wherein upper housing 12 is positioned adjacent to barrel body 13. The upper housing 12 may be mounted to an exterior side surface of the barrel body 13 (see FIGS. 1-2). The upper housing 12 is positioned between opposing ends of the barrel body. Upper housing 12 may integrally formed (e.g., by injection molding) with the barrel body. Alternatively, upper housing may be affixed or bonded to barrel body 13 by one or more of the following: connectors, fastening elements, adhesives, snap-fit features, ultrasonic welding, or another suitable fastening method as understood by those skilled in the art. Such a configuration may allow for ease of manufacturing relative to optionally positioning at least one movable element 14 within chamber 30 (FIG. 1) formed generally between upper housing 12 and barrel body 13. Thus, generally, barrel assembly 40 may form a second passageway extending from a proximal barrel or inlet opening 34 to a distal barrel exit opening 44 and continuing on through the stopper assembly 50 (FIG. 1), described in greater detail below. As mentioned, the first air passageway extends from inlet opening 36 to exit opening or aperture 8. Both openings 36, 8 are in communication with an air passageway that leads to chamber 30 formed by upper housing 12 and barrel body 13. Optionally, one or more side vent apertures 32 may be in fluid communication with a chamber defined by upper housing 12 in combination with barrel body 13. Because first air passageway is formed, at least in part, in the barrel body 13 (FIG. 1), and because a planar, truncating side wall 35 (FIG. 6) is fowled in the barrel 12, the first and second game calls are closely positioned relative to each other, which reduces the overall top-to-bottom profile of the unitary call. Thus, the combined game call has a smaller vertical profile (e.g., the top-to-bottom dimension as shown in FIG. 4) than a combined profile of two independent and separate game calls of similar types.

FIG. 4 shows a schematic, side cross-sectional view of barrel assembly 40. As shown in FIG. 4, a passageway 28 may extend generally between second proximal barrel opening 36 and aperture 8. As shown in FIG. 4, first air passageway 28 may comprise lower recess 18, upper recess 22, and restricted recess 23. Thus, during use, air or any gas may be introduced into proximal barrel or inlet opening 36 and may flow through first air passageway 28 defined between upper housing 12 and barrel body 13. Further, air may flow or otherwise circulate within chamber 31 and may exit chamber 31 laterally of the main air passageway 28 through exit aperture 8, which may create desired sounds. As discussed above, a movable element in the form of a free-floating structure (e.g., one of elements 15, 17 or 19 of FIG. 1) may, optionally, be positioned generally within chamber 31, if desired, to facilitate generation of a varying sound, such as for example a trill, fluttering, or undulating sound. Thus, as shown in FIG. 4, barrel assembly 40 may be utilized for making desired sounds by forcing air into proximal barrel inlet opening 36.

In one embodiment, as shown in FIG. 4, first air passageway 28 is defined by upper housing 12 and barrel body 13. Passageway 28 includes chamber 31, and terminates at exit aperture 8 to form a whistle-type game call. Accordingly, any structure for defining a suitable whistle or whistle-like structure, or other structure for producing suitable high-pitched sounds may be incorporated within barrel assembly 40, without limitation. As will be appreciated by one of ordinary skill in the art, such a structure may be configured and used for generating sounds that mimic a selected game bird or game animal (e.g., waterfowl, upland birds, deer, elk, etc.), to attract such animals toward the sound. In another embodiment, such a structure may be configured and used for generating sounds for purposes in addition to calling game, such as, for instance, commanding or calling a hunting dog or for other communication purposes.

As shown in FIG. 4, a second air passageway 38 may extend between second proximal barrel inlet opening 34 and second distal barrel exit opening 44. The first and second passageways 28, 38 are shown arranged generally parallel with each other. The second distal barrel exit opening 44 is positioned distal of the exit aperture 8. More particularly, as shown in FIG. 4, a chamber wall 37 at least partially defining chamber 31 may protrude at least partially into passageway 38, and the cross sectional shape of second air passageway is generally circular and includes the planar, truncating wall 35, which further reduces the vertical profile of the combined game call. The presence of chamber wall 37 in the second passageway 38 may reduce a size of the second passageway 38 as compared to other locations along a length of the second passageway 38. Such a relatively compact structure provides suitable flow characteristics through passageway 38 as well as the chamber 31 defined between upper housing 12 and barrel body 13. Protrusion of at least a portion of the structure defining chamber 31 may influence a size and shape of a stopper assembly that may be inserted at least partially within the passageway 38. More specifically, FIG. 5 shows an end view of barrel assembly 40, as if looking into distal barrel exit opening 44. As shown in FIG. 5, air passageway 38 may exhibit a generally circular cross-sectional shape defined, at least to some extent, by interior surface 57 in combination with a transversely extending portion 56 of chamber wall 37 and truncating wall 35 (FIG. 6). Accordingly, a portion of a stopper assembly 50 (described in greater detail below) may be positioned within passageway 38, and a portion of stopper assembly may even extend below wall 37. Stated differently, one of ordinary skill in the art will appreciate that the presence of at least a portion of chamber wall 37 within passageway 38 may define an envelope within which a portion of a stopper assembly may be positioned. As discussed in further detail below, in some embodiments, depending on the shape and size of a portion of a stopper assembly positioned adjacent to a chamber wall, rotation of such a stopper assembly may, however, be limited.

FIG. 6 shows an end view of barrel assembly 40, as if looking toward proximal end 45 (i.e., into inlet openings 34 and 36) of barrel assembly 40. As shown, a portion of passageway 38 may be defined by arcuate surface 39 as well as the substantially planar, truncating wall 35. Extending farther into air passageway 38, the passageway 38 is further defined by the transverse length 56 of the bottom wall 37 of chamber 36 (FIG. 4). In one embodiment, as shown in FIG. 6, the cross-sectional shape of inlet opening 34 of barrel assembly 40 may comprise a generally circular portion and a substantially linear portion.

In some embodiments, as mentioned above, a stopper assembly 50 may be positioned at least partially within a barrel assembly 40. In one embodiment, a stopper assembly may include at least one vibrating element (e.g., at least one reed, at least one membrane, or any other suitable vibrating member as known to those skilled in the art) and may be configured to produce or generate sounds that mimic a selected animal (e.g., waterfowl, such as a duck or a goose, other birds, mammals, etc.). Some examples of stopper assemblies are described in U.S. Pat. No. 5,910,039, assigned to the assignee of the present invention, the disclosure of which is incorporated, in its entirety, by this reference. FIGS. 7 and 8 show perspective views of a game call assembly 10 including a barrel assembly 40 and a stopper assembly 50 coupled to one another. As discussed above, barrel opening 44 of barrel assembly 40 may be tapered or otherwise configured for coupling or engaging a hub portion 55 (FIG. 16) of stopper assembly 50. Any suitable stopper assembly as known to those skilled in the art (e.g., a single reed stopper assembly, a double reed stopper assembly, or another suitable stopper assembly) may be coupled to barrel assembly 40, without limitation.

For example, FIG. 9 shows the barrel assembly 40 shown in FIG. 5, wherein an insertion end 52 of stopper assembly 50 is inserted into and removably secured within passageway 38. As shown in FIG. 9, insertion end 52 of stopper assembly 50 define a passageway that is substantially congruent to the shape of passageway 38 as influenced by the transverse width of the exterior wall 37 of chamber 36 (FIGS. 4-6). Also as shown in FIG. 9, the air passageway defined by insertion end 52 is defined in substantial part by an arcuate interior surface 62 and a substantially planar interior surface 64 (but shown as a linear surface in FIG. 9). Accordingly, rotation of insertion portion 52 relative to barrel assembly 40 (e.g., in either a counterclockwise or clockwise direction) will be very limited; otherwise, insertion end 52 would come into contact with or bear against transversely extending portion 56 of barrel assembly 40.

Referring still to FIG. 9, the close nesting of the first game call apparatus and the second game call apparatus to provide the combined over-and-under game call apparatus may provide a relatively compact game call apparatus 10, which may exhibit an overall vertical profile or height H of about 1.25 inches. The reduced vertical profile makes the two calls easer to use (the user's lips have less distance to travel), easier to stow, and easier to handle.

FIGS. 10-12 show a schematic top view, bottom view, and side view, respectively, of the game call apparatus 10 shown in FIGS. 7 and 8. In addition, FIGS. 13 and 14 show respective end views of the game call apparatus 10 shown in FIGS. 7 and 8.

Figure 15:
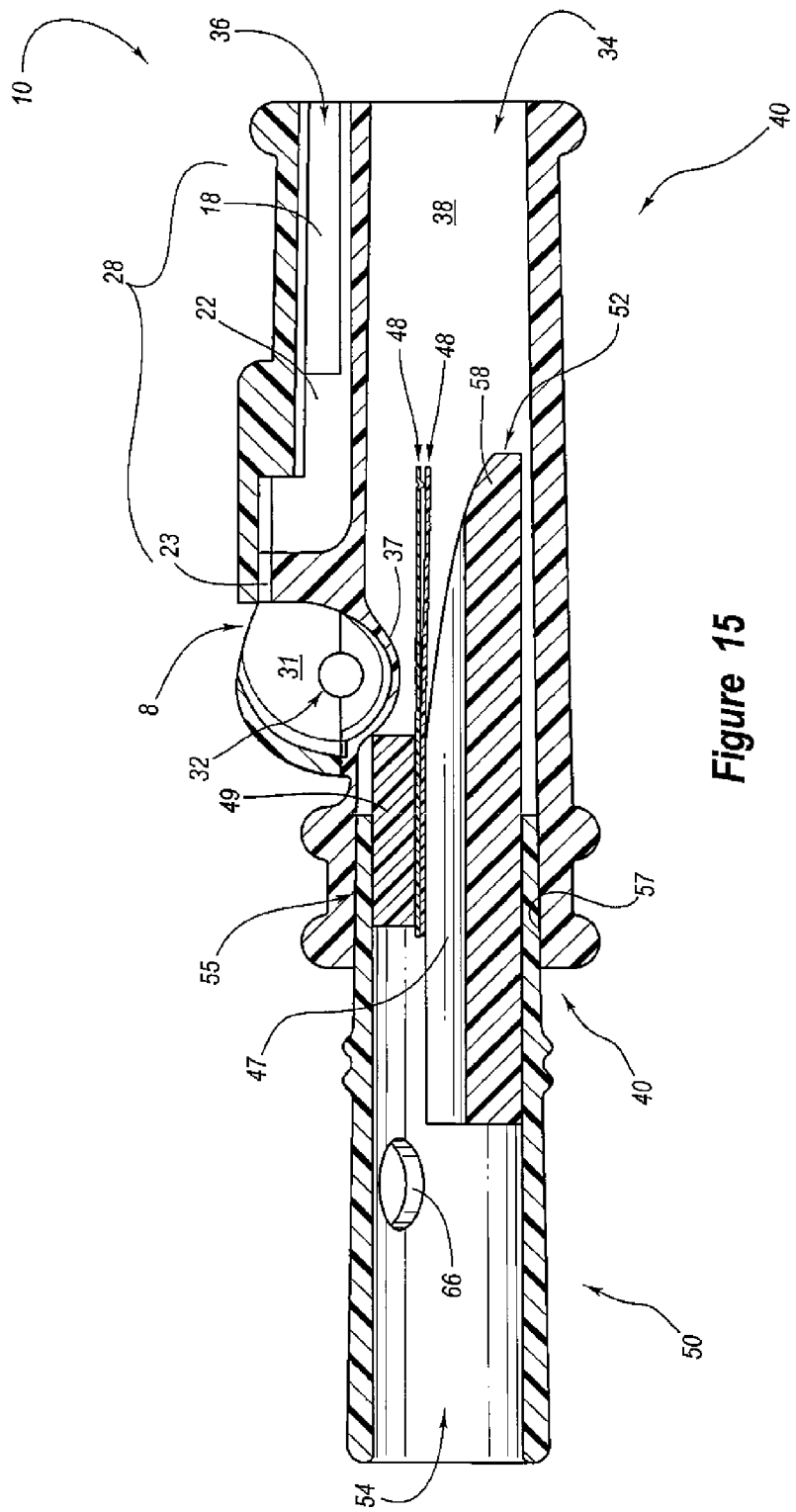
FIG. 15 shows a schematic, side cross-sectional view of the game call apparatus shown in FIGS. 7 and 8.

In one embodiment, a stopper assembly 50 may comprise a reed assembly including at least one reed. In another embodiment, a stopper assembly may comprise two reeds. For example, FIG. 15 shows a schematic, side cross-sectional view of the game call assembly 10, shown in FIG. 14, including a stopper assembly 50 coupled to a barrel assembly 40. As shown in FIG. 15, stopper assembly 50 may include a sounding board 58, a wedge piece 49, and two reeds 48 positioned between the wedge piece 49 and the sounding board 58. Further, sounding board 58 may define a channel 47 that extends longitudinally within the stopper assembly 50. As mentioned above, a portion of stopper assembly 50 may be positioned within distal barrel opening 44 (FIG. 4) of barrel assembly 40 so that the stopper assembly 50 and the barrel assembly 40 are coupled to one another. More specifically, an interior surface 57 of barrel assembly 40 may come into contact with or abut an exterior surface 55 of stopper assembly 50 to form a type of friction fit. As mentioned above, in one embodiment, surfaces 55 and 57 may be tapered in a complimentary fashion.

Figure 16:
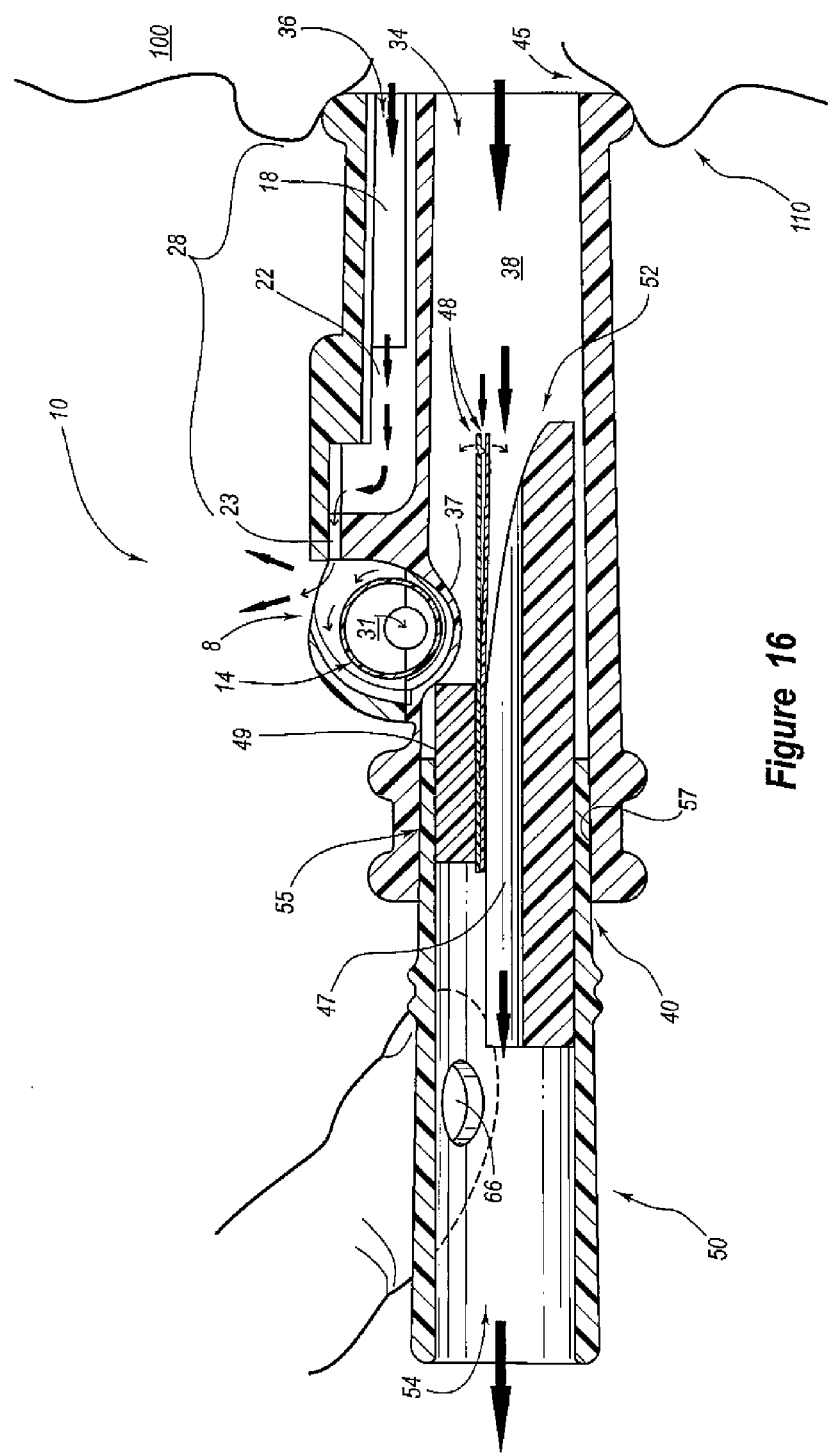
FIG. 16 shows a schematic, side cross-sectional view of the game call apparatus shown in FIGS. 7 and 8 during use.

FIG. 16 shows a schematic, side cross-sectional view of the game call apparatus 10 as shown in FIG. 15 during use. Particularly, a mouth region 110 of a user 100 may be positioned generally adjacent to or at least partially against end region 45 of barrel assembly 40. Further, air may be selectively forced through passageway 28, passageway 38, or both. For example, air may be forced exclusively through passageway 28 (i.e., recesses 18, 22, 23) and into chamber 31, which may optionally include a free floating structure 14, by positioning the user's lips solely around inlet aperture 36. Air may exit chamber 31 via exit aperture 8. Such air flow may produce a whistling sound. Alternatively, for example, air may be forced exclusively through air passageway 38 by positioning the user's lips solely around inlet opening 34, so that air passes over reeds 48, and into channel 47. Such airflow may cause reeds 48 to vibrate and produce desired sounds (e.g., typical waterfowl sounds or other animal sounds). Optionally, a tone variation aperture 66 may be fowled through a portion of stopper assembly 50 and may be selectively at least partially closed or opened by a thumb or finger of a user to achieve desired sounds during use.

While certain embodiments and details have been included herein and in the attached invention disclosure for purposes of illustrating the invention, it will be apparent to those skilled in the art that various changes in the methods and apparatus disclosed herein may be made without departing form the scope of the invention, which is defined in the appended claims. The words "including" and "having," as used herein, including the claims, shall have the same meaning as the word "comprising."

What is claimed is:

1. A combined game call apparatus, comprising:
   a unitary game call body in which a first game call and a second game call are formed in an over-and-under manner relative to each other, the unitary game call body including a barrel body and an upper housing mounted to an exterior side surface of the barrel body;
   the first game call having a first inlet, a first air passageway associated with the first inlet, a chamber in flow communication with the first air passageway, and a single exit aperture open to the chamber in a lateral direction at a distal end of the first game call, the first air passageway being defined at least in part by the barrel body and at least in part by the upper housing;
   the second game call having a second inlet, a second air passageway associated with the second air inlet, and an exit opening, the second air passageway being arranged in parallel with the first air passageway, the exit opening being position distal of the exit aperture;
   wherein the first game call comprises a whistle-type game call and the second game call comprises a waterfowl call.

2. The combined game call apparatus of claim 1, wherein the whistle-type game call comprises a free-floating structure disposed inside the chamber to create a trill when air passes through the first air passageway.

3. The combined game call apparatus of claim 1, wherein the whistle-type game call comprises a tubular cylinder structure disposed inside the chamber to create a trill when air passes through the first air passageway.

4. The combined game call apparatus of claim 1, wherein the whistle-type game call comprises a free-floating structure disposed inside the chamber to create a trill when air passes through the first air passageway;
   wherein the free floating structure is selected from the group consisting of a generally tubular cylinder, a solid generally cylindrical element, and a generally spherical element.

5. The combined game call apparatus of claim 1, wherein the whistle-type game call creates a fluttering whistle sound of a duck.

6. The combined game call apparatus of claim 1, wherein the whistle-type game call creates a grunting sound of a duck.

7. The combined game call apparatus of claim 1, wherein the exit aperture directs air to exit the game call laterally of the chamber.

8. The combined game call apparatus of claim 1, wherein a cross-sectional shape of the first air passageway is substantially circular and the cross section shape of the second air passageway is generally circular with a truncating wall proximate the first air passageway.

9. A combined game call apparatus, comprising:
   a unitary game call body;
   a first game call and a second game call formed in the unitary body in an over-and-under configuration;
   the first game call having a first inlet, a first air passageway associated with the first inlet, a chamber in flow communication with the first air passageway, and an exit aperture open to the chamber in a lateral direction, a cross section of the first air passageway being substantially circular in cross section;

the second game call having a second inlet and a second air passageway associated with the second air inlet, the second air passageway having at least first, second and third portions, the first portion having a first cross section with a curved portion, a linear portion, and a first cross sectional size, the linear portion being proximate the first air passageway, the second portion having a reduced second cross sectional size as compared to the first cross sectional size, the second portion being proximate the chamber, and the third portion being positioned distal of the second portion and having a different cross sectional size than the first and second cross sectional sizes.

10. The combined game call apparatus of claim 9, wherein the first game call comprises a whistle-type game call;

wherein the whistle-type game call comprises a tubular structure disposed inside the chamber to create a trill when air passes through the first air passageway.

11. The combined game call apparatus of claim 9, wherein the first game call comprises a whistle-type game call, and the whistle-type game call comprises a free-floating structure disposed inside the chamber to create a trill when air passes through the first air passageway;

wherein the free floating structure is selected from the group consisting of a generally tubular cylinder, a solid generally cylindrical element, and a generally spherical element.

12. The combined game call apparatus of claim 9, wherein the first game call comprises a whistle-type game call, and the whistle-type game call comprises a generally tubular cylinder which moves about the chamber when air passes through the first air passageway to create a trill sound.

13. The combined game call apparatus of claim 9, wherein the exit aperture directs air to exit the game call laterally of the chamber at a location spaced proximal of a distal end of the unitary game call body.

14. The combined game call apparatus of claim 9, wherein the first game call comprises a whistle-type game call, and wherein the whistle-type game call creates a fluttering whistle sound of a duck.

15. The combined game call apparatus of claim 9, wherein the first game call comprises a whistle-type game call, and wherein the whistle-type game call creates a grunting sound of a duck.

16. A combined game call apparatus, comprising:

a barrel body, an upper housing, and a stopper assembly, the upper housing being mounted to the barrel body along an exterior side surface of the barrel body, the stopper assembly being mounted at an exit opening of the barrel body;

a first game call and a second game call defined by the barrel body, upper housing, and stopper assembly in an over-and-under configuration;

the first game call having a first inlet at a proximal end of the barrel body, a first air passageway associated with the first inlet, a chamber, a free-floating structure disposed inside the chamber to create a trill when air passes through the first air passageway, and an outlet aperture, the first air passageway being defined in part by the barrel body and defined in part by the upper housing;

the second game call being defined by the barrel body and the stopper assembly, the second game call having a second inlet spaced from the first inlet at the proximal end of the barrel body, a second air passageway associated with the second air inlet, at least one reed carried by the stopper assembly, and an outlet opening defined by the stopper assembly, the outlet opening being spaced distal of the outlet aperture.

17. The combined game call apparatus of claim 16, wherein the second air passageway is generally circular in cross section and has a truncating, planar side wall proximate the first air passageway.

18. The combined game call apparatus of claim 16, wherein the stopper assembly is arranged coaxially with the second air passageway.

19. The combined game call apparatus of claim 16, wherein the upper housing is spaced between proximal and distal ends of the barrel body.

* * * * *